Patented Oct. 2, 1923.

1,469,507

UNITED STATES PATENT OFFICE.

WALTER GLAESER, OF BROOKLYN, NEW YORK, ASSIGNOR TO POTASH EXTRACTION CORPORATION, OF NEW YORK, N. Y., A CORPORATION OF NEW YORK.

EXTRACTION OF POTASSIUM COMPOUNDS.

No Drawing. Application filed June 7, 1918. Serial No. 238,767.

*To all whom it may concern:*

Be it known that I, WALTER GLAESER, a subject of the German Emperor (holding first papers of citizenship of the United States), and a resident of Brooklyn, county of Kings, and State of New York, have invented a new and useful Improvement in the Extraction of Potassium Compounds, of which the following is a specification, the principle of the invention being herein explained and the best mode in which I have contemplated applying that principle, so as to distinguish it from other inventions.

The present process, relating, as indicated, to potassium extraction, is particularly concerned with a method of recovering the reagents used in the treatment of silicate to render the potassium compounds water soluble, and at the same time increasing the value of the mixture containing the water soluble potassium compounds by adding thereto phosphate converted into an available form. The present invention is of special application to the mixture produced by the treatment of potassium bearing silicates with calcium chloride in the manner set forth in my Patent No. 1,254,677, issued January 29, 1918. The present invention may, however, be broadly considered as an improved method for the separation of heavy metal, and alkaline earth metal chlorides from light metal chlorides, such as potassium, sodium, lithium, etc. To the accomplishment of the foregoing and related ends, said invention, then, consists of the means hereinafter fully described and particularly pointed out in the claim.

The following description sets forth in detail one approved method of carrying out the invention, such disclosed method, however, constituting but one of the various ways in which the principle of the invention may be used.

In my Patent No. 1,254,677 issued January 29, 1918, I have described a process for rendering available the potassium contained in potassium-bearing silicates, which consists in heating a mixture of potassium containing silicate with a large excess of calcium chloride in the presence of small amounts of coke and iron oxide out of contact with the air, in this way transforming the potassium present into water soluble potassium chloride.

The present process consists in the further treatment of material resulting from the above described process in a suitable furnace. It will be understood that a similar mixture to that obtained by the above mentioned process may be treated to advantage in the manner to be described, as it is immaterial as to how or by what means the mixture in question is produced. The mixture produced by the above process or an equivalent mixture contains potassium chloride, an insoluble silicate and small amounts of coke, ferrous oxide, calcium chloride and iron chlorides. The potassium chloride, the calcium chloride, and the small amount of iron chlorides, which together amount to about 40 to 50 per cent of the mixture, are first leached out with water, and then evaporated and crystallized into solid form. This mixture of potassium chloride and calcium chloride is then mixed with tri-calcium phosphate and heated at a temperature of about 1200° Fahr. in a suitable muffle furnace, while steam is being blown in at the discharge end. Hydrochloric acid is formed by the action of the steam upon the calcium chloride, while the potassium chloride is left intact. The tri-calcium phosphate does not enter into the reaction between the steam and the calcium chloride, but acts as a combining agent to hasten the reaction and cause the same to go to completion. The reaction in question is as follows:—

(1) 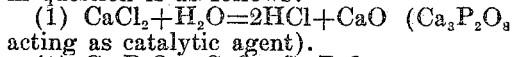 ($Ca_3P_2O_8$ acting as catalytic agent).

(2) 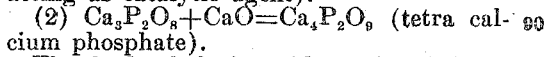 (tetra calcium phosphate).

The hydrochloric acid produced is in gaseous form and may be withdrawn and condensed in any suitable manner. The calcium oxide formed by the above reaction combines with the tri-calcium phosphate in the manner indicated by the second equation to produce tetra-calcium phosphate, which is slowly soluble in standard ammonium citrate solution depending upon the degree of fineness and is thus available as a fertilizer since it is in a condition in which it is easily assimilated by plants.

The potassium chloride in the mixture is left untouched by the above reactions and may be leached out of the mixture while the residue, after the extraction of the potassium chloride, is principally tetra-calcium phosphate.

The hydrochloric acid collected may be used in the decomposition of phosphate rock as described in United States Patent No. 1,254,677 and an equivalent amount of calcium chloride is regained, or the acid may be used of course in other ways. This process serves to recover the calcium chloride which would otherwise be wasted and also produces an available phosphate of considerable value and in considerable quantity as a by-product, and at the same time affords indirectly an economical method of separation of heavy metal, or alkaline earth metal chlorides from alkali metal chlorides as will be evident.

The separation of the alkaline earth metal chlorides from the alkali metal chlorides is effected because of the fact that the calcium chloride present is converted into calcium tetraphosphate and hydrochloric acid, leaving the potassium chloride present in its original soluble state. The soluble potassium chloride is then separated from the phosphate by leaching out the soluble chloride or by any other suitable and convenient means.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

In a method of separating potassium and calcium chlorides, the steps which consist in heating a mixture of such chlorides with tricalcium phosphate in the presence of steam, and then leaching out the water soluble potassium chloride in the residue.

Signed by me, this 29th day of May, 1918.

WALTER GLAESER.